United States Patent
Dibiaso et al.

(10) Patent No.: US 7,830,983 B2
(45) Date of Patent: *Nov. 9, 2010

(54) METHOD TO MINIMIZE DEGRADATION IN A D-MPSK HIERARCHICAL MODULATION SYSTEM

(75) Inventors: Eric A. Dibiaso, Kokomo, IN (US); Glenn A. Walker, Greentown, IN (US); Michael L. Hiatt, Jr., Westfield, IN (US)

(73) Assignee: Delphi Technologies, Inc., Troy, MI (US)

( * ) Notice: Subject to any disclaimer, the term of this patent is extended or adjusted under 35 U.S.C. 154(b) by 1174 days.

This patent is subject to a terminal disclaimer.

(21) Appl. No.: 11/069,254

(22) Filed: Mar. 1, 2005

(65) Prior Publication Data

US 2006/0198452 A1    Sep. 7, 2006

(51) Int. Cl.
H04L 27/20 (2006.01)

(52) U.S. Cl. .......... 375/308; 375/355; 375/298; 375/135; 375/136; 370/305; 370/350

(58) Field of Classification Search ............ 375/308, 375/355, 298, 135, 136; 370/305, 350
See application file for complete search history.

(56) References Cited

U.S. PATENT DOCUMENTS

| | | |
|---|---|---|
| 5,646,935 A | 7/1997 | Ishilawa et al. |
| 5,687,166 A | 11/1997 | Natali et al. |
| 5,771,224 A | 6/1998 | Seki et al. |
| 5,903,546 A | 5/1999 | Ikeda et al. |
| 5,966,412 A | 10/1999 | Ramaswamy |
| 6,119,827 A | 9/2000 | Militello et al. |
| 6,510,317 B1 | 1/2003 | Marko et al. |
| 6,570,858 B1 | 5/2003 | Emmons, Jr. et al. |
| 6,741,834 B1 | 5/2004 | Godwin |
| 6,823,169 B2 | 11/2004 | Marko et al. |
| 6,996,418 B2 | 2/2006 | Teo et al. |
| 7,000,241 B2 | 2/2006 | Klauss et al. |
| 7,061,997 B1 * | 6/2006 | Eberlein et al. .......... 375/332 |
| 7,065,355 B2 | 6/2006 | Spio |
| 7,079,585 B1 * | 7/2006 | Settle et al. .......... 375/261 |

(Continued)

FOREIGN PATENT DOCUMENTS

EP    0594505    10/1993

(Continued)

OTHER PUBLICATIONS

Schertz, Weck; Hierarchical modulation-the transmission of two independent DVB-T multiplexes on a single frequency; EBU Technical Review; Apr. 2003; pp. 1-13.

(Continued)

Primary Examiner—Shuwang Liu
Assistant Examiner—Kabir A Timory
(74) Attorney, Agent, or Firm—Thomas N. Twomey

(57) ABSTRACT

The present invention provides a method to minimize degradation in a D-MPSK hierarchical modulation system by adding additional data throughput (i.e., secondary information) as an offset to the primary signal transmitted by a SDARS terrestrial repeater. The present invention provides techniques for adding the additional throughput as Level 2 data by transmitting offset phase and/or amplitude information across adjacent OFDM symbols and/or adjacent frequency subcarriers.

22 Claims, 4 Drawing Sheets

U.S. PATENT DOCUMENTS

| | | | |
|---|---|---|---|
| 7,095,369 B1* | 8/2006 | Clark | 342/357.02 |
| 7,215,713 B2 | 5/2007 | Walker et al. | |
| 7,230,992 B2 | 6/2007 | Walker et al. | |
| 7,230,998 B2 | 6/2007 | Walker et al. | |
| 7,260,159 B2 | 8/2007 | Lee et al. | |
| 7,269,125 B2* | 9/2007 | Smallcomb | 370/208 |
| 7,280,613 B2 | 10/2007 | Walker et al. | |
| 2004/0141457 A1* | 7/2004 | Seo et al. | 370/203 |
| 2005/0005120 A1 | 1/2005 | Kahn et al. | |
| 2005/0117669 A1 | 6/2005 | Walker et al. | |
| 2005/0128141 A1* | 6/2005 | Howell | 342/372 |

FOREIGN PATENT DOCUMENTS

| | | |
|---|---|---|
| EP | 1 113 607 | 7/2001 |
| WO | 01/39454 | 5/2001 |
| WO | 2004/100479 | 11/2004 |

OTHER PUBLICATIONS

Pursley, et al.; "Adaptive Nonuniform Phase-Shift-Key Modulation for Multimedia Traffic in Wireless networks"; IEEE Journal on Selected Areas in Communications, vol. 18, No. 8, Aug. 2000; pp. 1394-1407.

Vitthaladevuni, et al.; Effect of Imperfect Phase and Timing Synchronization on the Error Rate performance of PSK Modulations; IEEE Mar. 2002; pp. 356-360.

Hossain, et al.; Hierarchial Modulations for Multimedia and Multicast Transmission over Fading Channels; IEEE Mar. 2003; pp. 2633-2637.

Pursley, et al.; "Nonuniform Phase-Shift-Key modulation for Multimedia Multicast Transmission in Mobile Wireless Networks"; IEEE Journal on Selected Areas in Communications, vol. 17, No. 5, May 1999, pp. 774-783.

Vittaladevuni, et al.; "Exact BER computation of Generalized Hierarchial PSK Constellations"; IEEE Feb. 2002, pp. 1974-1978.

J. Sesna; The DBV satellite, cable and SMATV systems; EBU Technical Review; Winter 1995; pp. 24-38.

Tanner; UBS Looks Southward, UBS, a Canadian Developer of MMDS Equipment, Has Its Eyes on the U.S.; Aug. 2001; www.shorecliffordcommunications.com, Broadband Wireless Online, pp. 1-6.

Yoshida; new DBC satellite modulation scheme drops Turbo; Mar. 7, 2003; EETIMESUK, www.electronicstimes.com; p. 1.

* cited by examiner

Phase Across Subcarriers

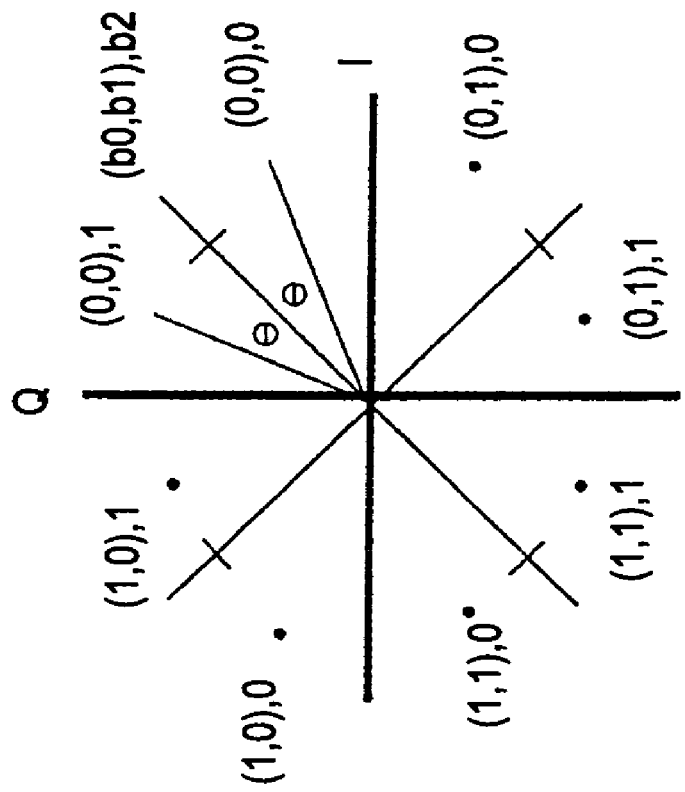
Figure 5 Gray Coded
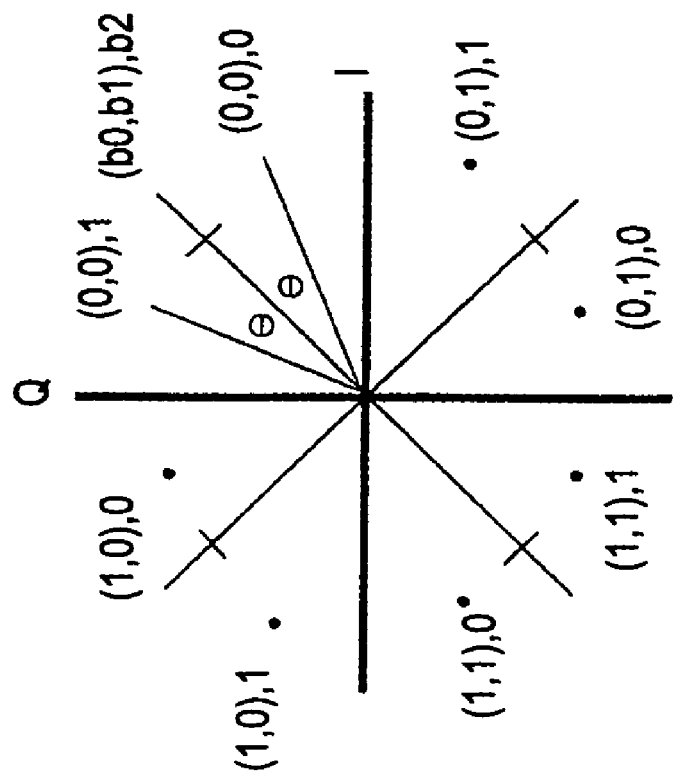
Figure 4 Non-Gray Coded

METHOD TO MINIMIZE DEGRADATION IN A D-MPSK HIERARCHICAL MODULATION SYSTEM

TECHNICAL BACKGROUND

The present invention generally relates to the transmission of digital data, and more particularly, to the transmission of digital data in a satellite digital audio radio ("SDAR") system.

BACKGROUND OF THE INVENTION

In October of 1997, the Federal Communications Commission (FCC) granted two national satellite radio broadcast licenses. In doing so, the FCC allocated 25 megahertz (MHz) of the electromagnetic spectrum for satellite digital broadcasting, 12.5 MHz of which are owned by XM Satellite Radio, Inc. of Washington, D.C. ("XM"), and 12.5 MHz of which are owned by Sirius Satellite Radio, Inc. of New York City, N.Y. ("Sirius"). Both companies provide subscription-based digital audio that is transmitted from communication satellites, and the services provided by these—and eventually other—companies (i.e., SDAR companies) are capable of being transmitted to both mobile and fixed receivers on the ground.

In the XM satellite system, two communication satellites are present in a geostationary orbit, one satellite at a specific longitude and the other at a specific latitude. Accordingly, the satellites always seem to be position above the same spot on the earth. In the Sirius satellite system, however, three communication satellites are present that orbit the earth at a specific longitude and while moving across latitudes and, relative to the northern hemisphere, rise and set once a day. Consequently, two of the three satellites are "visible" to receivers in the United States at all times. Since both satellite systems provide audio data to mobile receivers in urban canyons and other high population density areas with limited line-of-sight satellite coverage, both systems use terrestrial repeaters to receive and re-broadcast the same audio data that is transmitted by the respective satellite systems.

There is a need to add additional data throughput in an SDARS system to minimize degradation. Mobile wireless systems operate under unique and challenging channel conditions. Factors such as multipath, intersymbol interference, and Doppler shift make the wireless channel unpredictable. These factors are all related to the variability that is introduced by the mobility of the user and the wide range of environments that might be encountered. Mobile data systems, such as the SDARS system, face challenges such as these as a result of the vagaries of the wireless environment.

SUMMARY OF THE INVENTION

The present invention provides a method and apparatus for minimizing degradation in a D-MPSK modulation system by adding additional data throughput. There are techniques to add hierarchical modulation in both satellite and terrestrial signals. Most commonly used for stationary systems, these are typically straightforward phase and magnitude adjustments. Some are also designed prior to system deployment, such as terrestrial digital video broadcasting (DVB) hierarchical modulation.

Problems arise when performing similar techniques in mobile applications. Problems that might arise include multipath, intersymbol interference (ISI), and Doppler shift. Multipath refers to the phenomenon that occurs as a transmitted signal is reflected by objects in the environment between the transmitter and the user. While the signal is en route, walls, chairs, desks, and other items get in the way and cause the signal to bounce in different directions. A portion of the signal might go directly to the destination, and another part may bounce from a chair to the ceiling, and then to the destination. As a result, some of the signal will encounter delay and travel longer paths to the receiver resulting in random signal fades.

Intersymbol interference (ISI) describes the situation where the energy from one symbol spills over into another symbol resulting in signal fades. ISI is caused by the frequency selectivity (time dispersion) of the channel due to multipath propagation. Doppler shift describes the random changes in the channel introduced as a result of a user's mobility and the relative motion of objects in the channel. Doppler has the effect of shifting, or spreading, the frequency components of a signal resulting in signal fades.

Some terrestrial audio broadcast systems use differential multiple phase shift keying (D-MPSK) modulation (e.g., D-BPSK, D-QPSK, pi/4 D-QPSK). Standard differential modulation techniques like D-MPSK encode the data in the phase difference between two consecutive PSK symbols. The present invention provides a D-MPSK modulation technique that may be accomplished by transmitting the phase information across adjacent orthogonal frequency-division multiplexing (OFDM) symbols or adjacent frequency subcarriers. OFDM works by splitting the radio signal into multiple smaller sub-signals that are then transmitted simultaneously at different frequencies to the receiver. OFDM reduces interference in signal transmissions. In an OFDM system the differential modulation may be across adjacent frequency subcarriers in one OFDM symbol or on the frequency subcarrier across two adjacent OFDM symbols. In either case, estimates due to phase offsets may be used to improve performance.

The present invention provides a method to minimize degradation in a D-MPSK hierarchical modulation system. Additional data may be added to the current SDARS satellite signals as a phase offset from the legacy quadrature phase shift keying (QPSK) modulated data and transmitted by the SDAR terrestrial repeaters. This extra data is received as the phase error from the QPSK demodulator. This implementation of receiving the additional data is possible because the SDARS receiver is coherent with the QPSK satellite symbol. This means the receiver must accurately know the frequency and phase of the transmitted signal. However, differential modulation (D-MPSK), as transmitted by the conventional SDAR terrestrial repeaters, only requires a non-coherent receiver to decode the signal. Therefore, the present invention provides a different method for adding the hierarchical data into the signal of the terrestrial repeaters to optimize the performance of both the primary and additional data for legacy systems.

BRIEF DESCRIPTION OF THE DRAWINGS

The above-mentioned and other features and objects of this invention, and the manner of attaining them, will become more apparent and the invention itself will be better understood by reference to the following description of embodiments of the invention taken in conjunction with the accompanying drawings, wherein:

FIGS. 4 and 5 are quadrature diagrams depicting the modulation techniques of the present invention.

Figure 1:
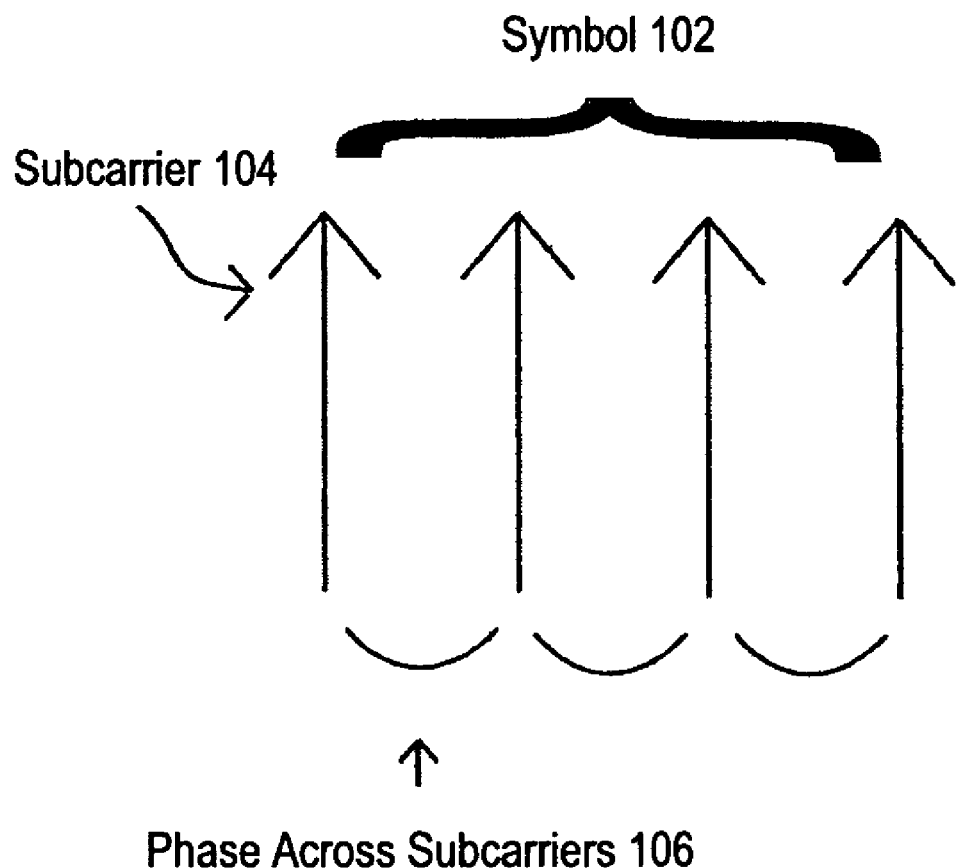
FIG. 1 is a schematic diagram of a technique for adding additional throughput by transmitting the phase information across adjacent frequency subcarriers.

Corresponding reference characters indicate corresponding parts throughout the several views. Although the drawings represent embodiments of the present invention, the drawings are not necessarily to scale and certain features may be exaggerated in order to better illustrate and explain the present invention. The exemplifications set out herein illustrate embodiments of the invention in several forms and such exemplification is not to be construed as limiting the scope of the invention in any manner.

DESCRIPTION OF INVENTION

The embodiments discussed below are not intended to be exhaustive or limit the invention to the precise forms disclosed in the following detailed description. Rather, the embodiments are chosen and described so that others skilled in the art may utilize their teachings.

For the purposes of the present invention, certain terms shall be interpreted accordance with the following definitions.

"Orthogonal frequency division multiplexing" or "OFDM" hereinafter refers to the communications technique that divides a communications channel into a number of equally spaced frequency bands. A subcarrier carrying a portion of the data is transmitted in each band. Each subcarrier is independent of every other subcarrier.

"Phase shift keying" or "PSK" hereinafter refers to a method of transmitting and receiving digital signals in which the phase of a transmitted signal is varied to convey information. Phase may also be an expression of relative displacement between or among waves having the same frequency.

"Quadrature phase shift keying" or "QPSK" hereinafter refers to a digital frequency modulation technique that is both easy to implement and fairly resistant to noise. With QPSK, the carrier undergoes four changes in phase (four symbols) and can thus represent two binary bits of data per symbol. Although this may seem insignificant initially, a modulation scheme has now been supposed that enables a carrier to transmit two bits of information instead of one, thus effectively doubling the bandwidth of the carrier.

"Hierarchical modulation" hereinafter describes when two separate data or bit streams are modulated onto a single data stream. Essentially, a "high priority" stream is superimposed upon, mapped on, or embedded within a "low priority" data stream. The high priority stream typically has a lower data rate than the low priority stream while being more robust. As such, the high priority stream is less susceptible to noise than it would be in a non-hierarchical modulation scheme. By using a lower code rate (i.e., the ratio of the data rate of the useful bits) the bits of the high priority stream may also be transmitted with a greater error protection than those bits of the low priority stream. Broadcasters of SDAR services may also use the high and low priority streams to target different types of receivers.

"First level data," "primary data" or "Level 1 data" hereinafter refers to existing data that may be interpreted by current (i.e., "legacy") SDAR receivers. First level data may either perform the same as or differently from second level, or secondary, data.

"Second level data," "secondary data," "Level 2 data," and/ or "hierarchical data" hereinafter refers to the additional data that is superimposed on the first level data to create a hierarchical modulated data stream. Second level data may either perform the same as (e.g., lower data rate) or perform differently from (e.g., higher data rate) first level data.

The present invention provides a method to minimize degradation in a D-MPSK hierarchical modulation system by adding additional data throughput (i.e., secondary information) as an offset to the primary signal transmitted by a conventional SDARS terrestrial repeater. The present invention provides techniques for receiving a primary signal having differential multiple phase shift keying (D-MPSK) modulation, adding a secondary signal to symbols from the D-MPSK modulated signal as an offset to produce an offset signal, and transmitting the offset signal using an orthogonal frequency-division multiplexing (OFDM) transmission system. The present invention provides techniques for adding the additional throughput to as Level 2 data by transmitting offset phase and/or amplitude information across adjacent OFDM symbols and/or adjacent frequency subcarriers.

Figure 6:
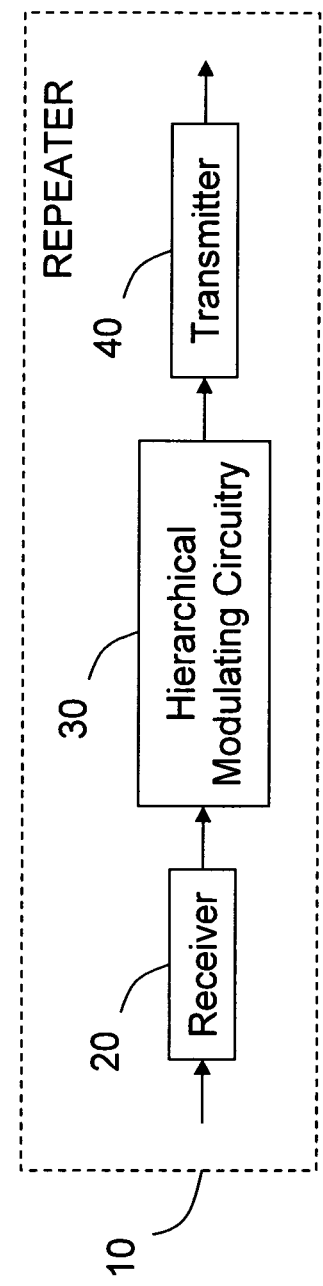
FIG. 6 is a block diagram of a repeater embodying the invention.

The system of the present invention may be further understood by considering the example of a SDAR arrangement having secondary data on the satellite signals and the terrestrial repeater signals. While the satellite signals may have the secondary data applied in a variety of methods, the terrestrial repeater uses the OFDM method. Referring to FIG. 6, a repeater 10 has a digital transmission receiver 20 adapted to detect the primary data signals and to receive the secondary data signals. The primary and secondary data signals may be provided by one or more satellites, or alternatively the primary and/or secondary signals may be provided by other methods such as by a separate satellite signal, a computer network signal or feed (such as through the internet), or by a ground based radio signal. The hierarchical modulating circuitry 30 of the repeater is adapted to combine the secondary data signals as a offset from the modulated primary data signals (for example, QPSK signals) to provide offset signals. The combined signals are provided to a transmitter 40 that transmits symbols using D-MPSK by transmitting the offset signals in an OFDM transmission system.

The adding of additional throughput to Level 2 data by transmitting the phase information across adjacent frequency subcarriers may be embodied in a schematic format as shown in FIG. 1. OFDM works by splitting the radio signal into multiple smaller sub-signals that are then transmitted simultaneously at different frequencies to the receiver. In an OFDM system the differential modulation may be across adjacent frequency subcarriers 106 in one OFDM symbol 102. Estimates due to phase offsets may be used to improve performance.

The method of the present invention may be understood in conjunction with and embodiment that involves receiving the legacy signal which has been quadrature phase shift keying (QPSK) modulated by two bits per symbol. The Level 2 offset is added to the symbols as a phase offset from the QPSK modulated data. Differential multiple phase shift keying (D-MPSK) is then accomplished by transmitting the phase information across adjacent frequency subcarriers in an OFDM system.

The implementation of a phase offset between two frequency subcarriers has shown through simulations to produce the least degradation to the legacy system. Details of this unique implementation are shown in the following example.

The example depicts this method on a pi/4 D-QPSK system. The original Level 1 bits and their corresponding constellation mapping are show below:

| Level 1 bits → | 1 0 | 1 1 | 0 0 | 0 1 |
|---|---|---|---|---|
| QPSK symbols → | 135° | −135° | 45° | −45° |
| Pi/4 D-QPSK symbols → (Dsym) | #1 (ref) 45° | #2 180° | #3 45° | #4 90° | #5 45° |

The above symbols would be transmitted in the legacy system. Level 1 bits are the two bits intended to be transmitted. QPSK symbols indicate the associated phase shift. The modulation used is pi/4 shifted Differential Quadrature Phase Shift Keying (pi/4-D-QPSK). In conventional QPSK there are four possible constellation points and the phase change can be 0, ±pi/2 or pi. In pi/4 DQPSK modulation, there are eight possible constellation points. Dsym specifies a symbol has been defined. To add the additional data (Level 2) to the transmission, the following steps are performed:

| Level 2 bits → | 0 | 0 | 1 | 0 |
|---|---|---|---|---|
| Level 2 symbol → (offset) | −15° | −15° | +15° | −15° |

A+/−15 degree offset from the original QPSK symbol is expected to provide the best performance in this embodiment, although there are variations in optimal performance depending on hardware and software implementations of the present invention. Therefore, the following equations have been developed to give a +/−15 degree offset for Differential Modulation:

$Tsym(1)=Dsym(1)$ (reference)

$Tsym(n)=Dsym(n)-Dsym(n-1)+\text{offset}+Tsym(n-1)$; for $n=2$:# of subcarriers

Tsym represents the symbol time period. The first equation represents a reference point for the first subcarrier. The second equation gives a +/−15 degree offset for Differential Modulation for the remaining subcarriers.

The following example shows the new transmitted symbols calculated from the above equation:

| Pi/4 D-QPSK symbols → (Dsym) | #1 (ref) 45° | #2 165° | #3 15° | #4 75° | #5 15° |
|---|---|---|---|---|---|

At the receiver (without noise), the differential demodulator would output the following symbols (#2-#1 ... ):

| Received symbols → | 120° | −150° | 60° | −60° |
|---|---|---|---|---|
| Error from QPSK symbols → | −15° | −15° | +15° | −15° |

As shown above, the error from the received QPSK symbols exactly matches the Level 2 phase offset added at the transmitter. This method is thought to produce the smallest degradation to the original pi/4 D-QPSK data in this embodiment.

Figure 2:
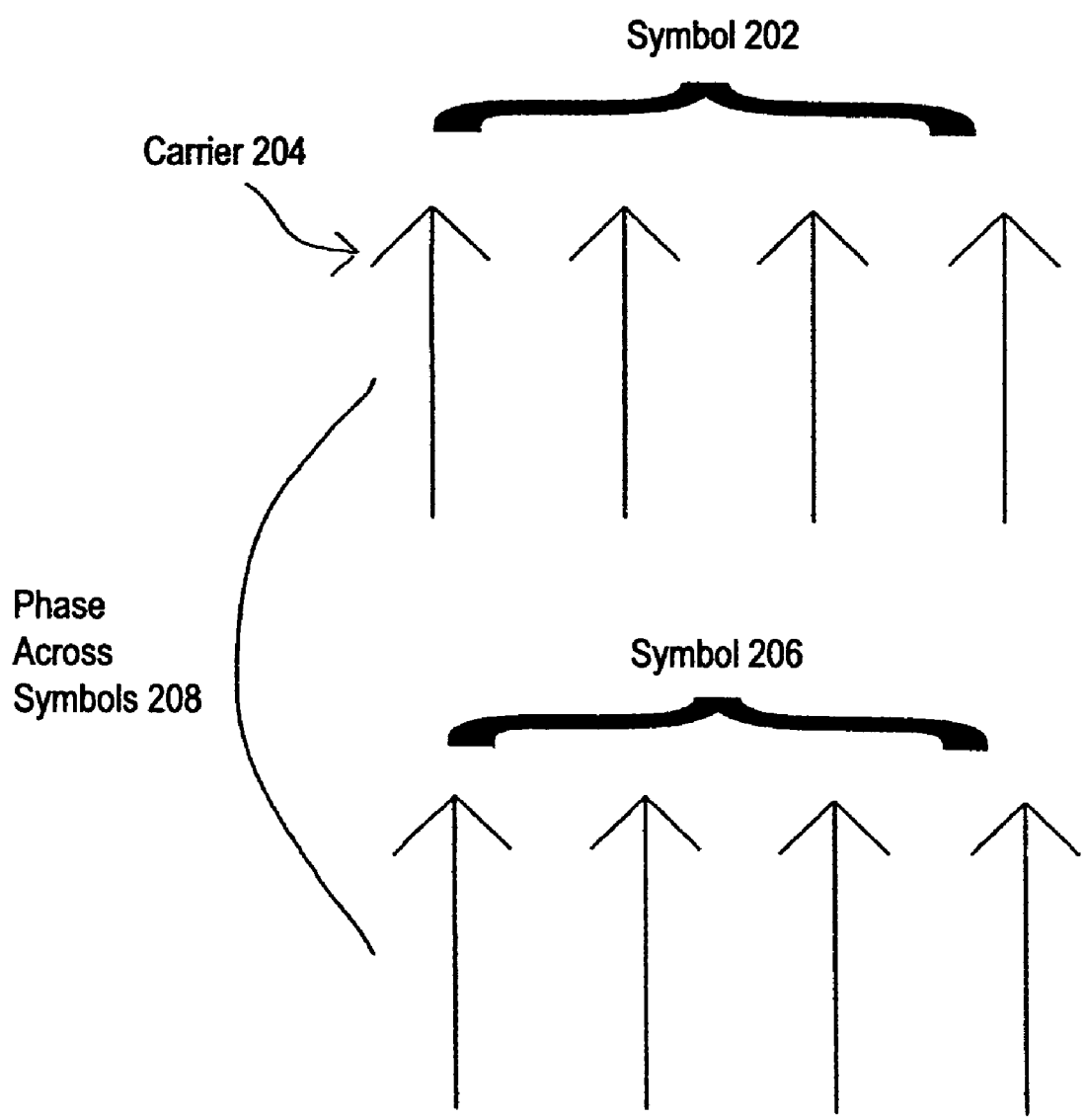
FIG. 2 is a schematic diagram of a technique for adding additional throughput by transmitting the phase information across adjacent OFDM symbols.

The adding of additional throughput to Level 2 data by transmitting the phase information across adjacent OFDM symbols may be embodied in a schematic format as shown in FIG. 2. Furthermore, the performance of the additional data may be improved by modifying the Level 2 bit mapping method shown in the example. The mapping above was simply:

| Level 2 Bit | Phase Offset |
|---|---|
| 0 | −15° |
| 1 | +15° |

This method produces a final constellation where the Level 2 bits (b2) are not gray coded as shown FIG. 4 below. For Level 2 gray coding, the mapping method as shown in FIG. 5 may be used. In the above embodiment, the mapping method optimizes the performance of the additional data.

| Level 2 Bit | Dsym(n) − Dsym(n − 1) | Phase Offset |
|---|---|---|
| 0 | 45°, −135° | −15° |
| 0 | 135°, −45° | +15° |
| 1 | 45°, −135° | +15° |
| 1 | 135(, −45( | −15( |

In another form of the present invention, the adding of additional throughput to Level 2 data may be accomplished by transmitting the phase information across adjacent orthogonal frequency-division multiplexing (OFDM) symbols. This method may be embodied in a schematic format as shown in FIG. 2. The Level 2 offset is added to the symbols as a phase offset from the legacy QPSK modulated data. Differential multiple phase shift keying (D-MPSK) is then accomplished by transmitting the phase information across adjacent OFDM symbols in an OFDM system. FIG. 2 depicts the phase information 208 being transmitted across adjacent OFDM symbols 202, 206 to minimize degradation.

In another form of the present invention, the transmission of the additional data may be done as an amplitude offset between the same frequency subcarriers on two adjacent OFDM symbols or between adjacent subcarriers on the same OFDM symbol. The implementation of the amplitude offset is similar to the phase offset except for the exceptions highlighted below.

To identically compare the phase and amplitude offset methods, the offset distance was calculated using the following equation: Amplitude offset=sin(phase offset). The major difference is the mapping of the Level 2 bits. The amplitude remains the same if the Level 2 bit is a zero, and it toggles if the Level 2 bit is a one, as shown below.

| Level 2 Bit | Amplitude of Tsym(n − 1) | Amplitude of Tsym(n) |
|---|---|---|
| 0 | −Amplitude Offset | −Amplitude Offset |
| 0 | +Amplitude Offset | +Amplitude Offset |
| 1 | −Amplitude Offset | +Amplitude Offset |
| 1 | +Amplitude Offset | −Amplitude Offset |

In still another form of the present invention, a combination of the two methods (phase offset and amplitude offset) described above may be used to add the additional data throughput to the signal transmitted by a SDARS terrestrial repeater to minimize degradation. This method further degrades the performance of the Level 1 legacy data (by decreasing Level 1 symbol energy), but will increase the performance of the Level 2 data (by increasing Level 2 symbol energy). This may be accomplished by transmitting the same Level 2 information twice (both with amplitude and phase offset) and combining them in the receiver. The combining may be done using Maximum Ration Combining (MRC) or by utilizing some type of complementary code on the Level 2 data. By using a complementary code, different parity bits may be transmitted with the amplitude and phase offsets and combined in the decoder to improve the error correction capability of the code.

The present invention provides a method to minimize degradation in a D-MPSK hierarchical modulation system by adding additional data throughput to the signal transmitted by a SDARS terrestrial repeater. The present invention provides techniques for adding the additional throughput to the Level 2 data by transmitting the phase information across adjacent OFDM symbols or adjacent frequency subcarriers. The techniques are shown using the flow diagrams in FIGS. 3A and 3B.

Figure 3A:
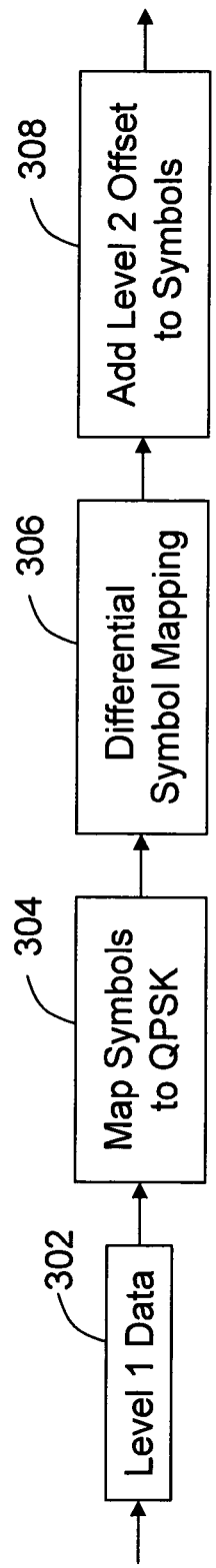
FIGS. 3A and 3B are schematic diagrams of embodiments of a hierarchical modulating circuitry and process useful in repeaters for adding additional throughput to a legacy signal.

In FIG. 3A, the hierarchical modulating circuitry 30 of repeater 10 receives the primary Level 1 data 302 that may be mapped to symbols using quadrature phase shift keying (QPSK) modulation (304). The symbols may then be modulated using a differential multiple phase shift keying (D-MPSK) modulation technique (306). The additional Level 2 data may be obtained by a separate satellite transmission, through an offset or superimposition of a primary PSK transmission, or an internet or other hard wired transmission, and accomplished by adding a secondary signal to symbols from the D-MPSK modulated signal as an offset to produce an offset signal for transmission by an OFDM transmitter (308).

Figure 3B:
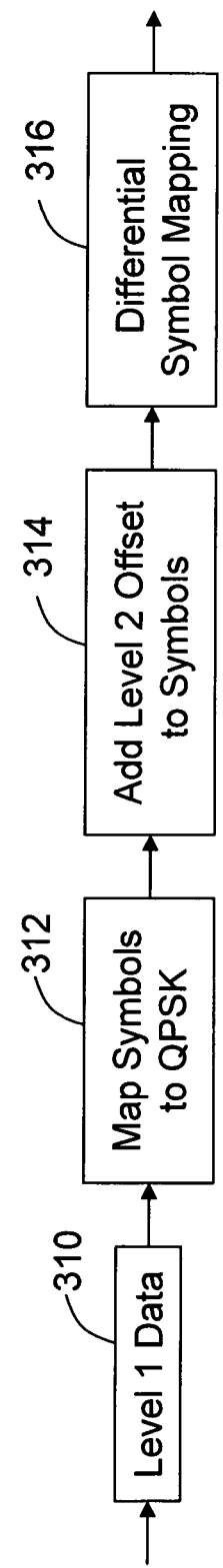

The repeater hierarchical modulating circuitry depicted in FIG. 3B is similar to that of FIG. 3A, the main difference being that the secondary Level 2 data is added to the QPSK modulated primary Level 1 data prior to, rather than after, the differential symbol mapping (D-MPSK). The primary Level 1 data 310 may be mapped to symbols using quadrature phase shift keying (QPSK) modulation (312). The additional Level 2 data may be obtained by a separate satellite transmission, through an offset or superimposition of a primary PSK transmission, or an internet or other hard wired transmission, and accomplished by adding a secondary signal to symbols from the QPSK modulated signal as an offset to produce an offset signal (314). The offset signal may then be transmitted using D-MPSK in an orthogonal frequency-division multiplexing (OFDM) transmission system (316).

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

The invention claimed is:

1. A method for transmitting additional data in a digital transmission system, comprising the steps of:
    receiving a primary signal comprising digital Level 1 data;
    performing digital multiple phase shift keying (D-MPSK) modulation on the digital Level 1 data;
    adding a secondary signal to the D-MPSK modulated digital Level 1 symbols as an offset to produce an offset signal, wherein the secondary signal comprises digital Level 2 data not derived from the received primary signal, such that the digital Level 2 data is additional data that is superimposed on the digital Level 1 data to create a hierarchical modulated data stream prior to differential signal mapping; and
    transmitting the offset signal on a carrier wave through space to receivers including legacy receivers using an orthogonal frequency-division multiplexing (OFDM) transmission system, wherein the step of adding the secondary signal further comprises adding equal and opposite phase shifts for alternative bit values of the digital Level 2 data as a function of superimposing the digital Level 2 data prior to the differential signal mapping.

2. The method of claim 1 wherein the step of adding a secondary signal further comprises transmitting symbols using D-MPSK by transmitting the phase information across adjacent OFDM symbols.

3. The method of claim 1 wherein the step of adding a secondary signal further comprises transmitting symbols using D-MPSK by transmitting the phase information across adjacent frequency subcarriers in an OFDM system.

4. The method of claim 1 wherein the equal and opposite phase shifts comprise plus and minus 15 degrees.

5. A method for transmitting additional data in a digital transmission system, comprising the steps of:
    receiving a primary signal comprising digital Level 1 data;
    performing quadrature phase shift keying (QPSK) modulation on the digital Level 1 data;
    adding a secondary signal to the QPSK modulated Level 1 data symbols as an offset to produce an offset signal, wherein the secondary signal comprises digital Level 2 data not being derived from the received primary signal, such that the digital Level 2 data is additional data that is superimposed on the digital Level 1 data to create a hierarchical modulated data stream prior to differential signal mapping; and
    transmitting the offset signal on a carrier wave through space to receivers including legacy receivers using D-MPSK in an OFDM transmission system, wherein the step of adding digital Level 2 data further comprises adding equal and opposite phase shifts for alternative bit values of the digital Level 2 data as a function of superimposing the digital Level 2 data prior to the differential signal mapping.

6. The method of claim 5 wherein the step of adding a secondary signal further comprises transmitting symbols using D-MPSK by transmitting the phase information across adjacent OFDM symbols.

7. The method of claim 5 wherein the step of adding a secondary signal further comprises transmitting symbols using D-MPSK by transmitting the phase information across adjacent frequency subcarriers in an OFDM system.

8. The method of claim 5 wherein the equal and opposite phase shifts comprise plus and minus 15 degrees.

9. An apparatus for transmitting additional data in a digital transmission system, said apparatus comprising:
    a digital transmission receiver adapted to receive a primary signal comprising digital Level 1 data, and perform digital multiple phase shift keying (D-MPSK) modulation of the digital Level 1 data;
    circuitry coupled to the receiver, the circuitry adapted to add a secondary signal to the D-MPSK modulated primary signals to produce an offset signal, wherein the secondary signal comprises digital Level 2 data not derived from the received primary signal, such that the digital Level 2 data is additional data that is superimposed on the digital Level 1 data to create a hierarchical modulated data stream prior to differential signal mapping; and
    a transmitter coupled to the circuitry, the transmitter adapted to transmit symbols using D-MPSK by transmitting the offset signal on a carrier wave through space to receivers of the transmitted offset signals including legacy receivers in an OFDM transmission system, wherein the circuitry coupled to the receiver adds the secondary signal as equal and opposite phase shifts for alternative bit values of the digital Level 2 data as a function of superimposing the digital Level 2 data prior to the differential signal mapping.

10. The apparatus of claim 9 wherein the transmitter is adapted to transmit symbols using D-MPSK by transmitting phase information across adjacent OFDM symbols.

11. The apparatus of claim 9 wherein the transmitter is adapted to transmit symbols using D-MPSK by transmitting the phase information across adjacent frequency subcarriers in an OFDM system.

12. The apparatus of claim 9 wherein the equal and opposite phase shifts comprise plus and minus 15 degrees.

13. An apparatus for transmitting additional data in a digital transmission system, said apparatus comprising:
a digital transmission receiver adapted to receive a primary signal comprising digital Level 1 data, and perform quadrature phase shift keying (QPSK) modulation on the digital Level 2 data;
circuitry coupled to the receiver, the circuitry adapted to add a secondary signal to the QPSK modulated primary signal to produce an offset signal, wherein the secondary signal comprises digital Level 2 data not derived from the received primary signal, such that the digital Level 2 data is additional data that is superimposed on the digital Level 1 data to create a hierarchical modulated data stream prior to differential signal mapping; and
a transmitter coupled to the circuitry, the transmitter adapted to transmit symbols using D-MPSK by transmitting the offset signal to receivers of the transmitted symbols including legacy receivers on a carrier wave through space in an OFDM transmission system, wherein the circuitry coupled to the receiver adds the secondary signal as equal and opposite phase shifts for alternative bit values of the digital Level 2 data as a function of superimposing the digital Level 2 data prior to the differential signal mapping.

14. The apparatus of claim 13 wherein the transmitter is adapted to transmit symbols using D-MPSK by transmitting phase information across adjacent OFDM symbols.

15. The apparatus of claim 13 wherein the transmitter is adapted to transmit symbols using D-MPSK by transmitting the phase information across adjacent frequency subcarriers in an OFDM system.

16. The apparatus of claim 13 wherein the equal and opposite phase shifts comprise plus and minus 15 degrees.

17. A method for transmitting additional data in a digital transmission system, the method comprising the steps of:
receiving a primary signal comprising digital Level 1 data;
performing differential multiple phase shift keying (D-MPSK) modulation on selected carriers of an orthogonal frequency-division multiplexing (OFDM) transmission signal;
adding a secondary signal to the D-MPSK modulated digital Level 1 data as a hierarchical modulation to produce a hierarchically modulated D-MPSK signal, wherein the secondary signal comprises digital Level 2 data not derived from the received primary signal, such that digital Level 2 data is additional data that is superimposed on the digital Level 1 data to create the hierarchical modulated data stream prior to differential signal mapping; and
transmitting the hierarchically modulated D-MPSK signal on a carrier wave through space to receivers including legacy receivers, wherein the step of adding the secondary signal further comprises adding the secondary data as equal and opposite amplitude offsets for alternative bit values of the digital Level 2 data as a function of superimposing the digital Level 2 data prior to differential signal mapping.

18. The method of claim 17, wherein the step of adding a secondary signal further comprises transmitting symbols using D-MPSK by transmitting the amplitude information across adjacent OFDM symbols.

19. The method of claim 17, wherein the step of adding a secondary signal further comprises transmitting symbols using D-MPSK by transmitting the amplitude information across adjacent frequency subcarriers in an OFDM system.

20. An apparatus for transmitting additional data in a digital transmission system comprising:
a digital transmission receiver adapted to receive a primary signal comprising digital Level 1 data, and perform digital multiple phase shift keying (D-MPSK) modulation on the digital Level 1 data of an orthogonal frequency-division multiplexing (OFDM) transmission signal;
circuitry coupled to the digital transmission receiver, the circuitry adapted to add a secondary signal to the D-MPSK modulated signal as a hierarchical modulation to produce a hierarchically modulated D-MPSK signal, wherein the secondary signal comprises digital Level 2 data not derived from the received primary signals, such that digital Level 2 data is additional data that is superimposed on the digital Level 1 data to create the hierarchical modulated data stream prior to differential signal mapping; and
a transmitter coupled to the circuitry, the transmitter adapted to transmit the hierarchically modulated D-MPSK signal on a carrier wave to receivers, including legacy receivers, wherein the secondary data is added as equal and opposite amplitude offsets for alternative bit values of the digital Level 2 data as a function of superimposing the digital Level 2 data prior to differential signal mapping.

21. The apparatus of claim 20, wherein the transmitter is adapted to transmit symbols using D-MPSK by transmitting amplitude information across adjacent OFDM symbols.

22. The apparatus of claim 20, wherein the transmitter is adapted to transmit symbols using D-MPSK by transmitting the amplitude information across adjacent frequency subcarriers in an OFDM system.

* * * * *